UNITED STATES PATENT OFFICE.

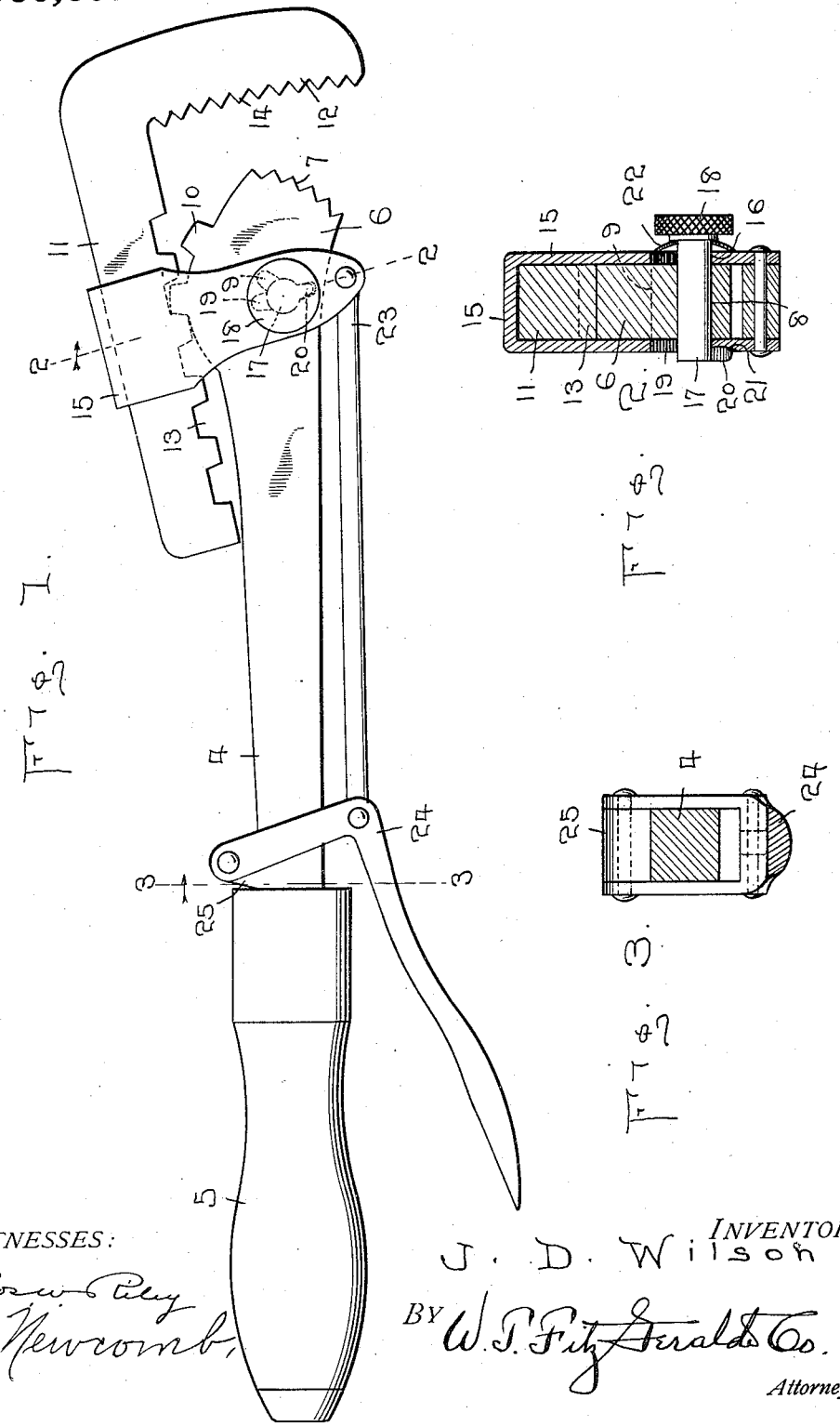

JAMES D. WILSON, OF SAN DIEGO, CALIFORNIA.

WRENCH.

1,060,391. Specification of Letters Patent. Patented Apr. 29, 1913.

Application filed February 15, 1912. Serial No. 677,660.

*To all whom it may concern:*

Be it known that I, JAMES D. WILSON, a citizen of the United States, residing at San Diego, in the county of San Diego and State of California, have invented certain new and useful Improvements in Wrenches; and I do hereby declare the following to be a full, clear, and exact description of the invention, such as will enable others skilled in the art to which it appertains to make and use the same.

My invention relates to new and useful improvements in wrenches and particularly to quick acting pipe wrenches.

The object of my invention is to so construct a wrench of the class described that the jaws thereof may be quickly brought into engagement with the object to be turned.

A further object of my invention is to provide means whereby the relative positions of the stationary and movable jaws may be changed when it is desired to grip objects of varying sizes.

Other objects and advantages of my invention will be hereinafter made clearly apparent in the specifications and pointed out in the claim.

In the accompanying drawings I have shown the preferred form which my invention may take.

In said drawings, Figure 1 is a side elevation of my improved form of wrench. Fig. 2 is a detail sectional view therethrough as seen on line 2—2, Fig. 1, looking in the direction of the arrow, and, Fig. 3 is a detail sectional view as seen on line 3—3, Fig. 1, looking in the direction of the arrow.

Referring to the drawings, in which similar reference numerals designate corresponding parts throughout the several views, 4 is the shank of my improved form of wrench, which is provided with a handle 5 at one end and with a head 6 at its opposite end. The end of the head 6 is provided with a plurality of teeth 7, which are adapted to be brought into engagement with one side of the object to be turned. The portion of the head having the teeth 7 thereon is obliquely and forwardly inclined, as shown in the drawings.

A bore 8 is formed from side to side through the head, as shown in Fig. 2, and a way 9 is also formed from side to side in said head, said way extending laterally of the bore 8, as indicated in Fig. 1, for a purpose hereinafter more clearly set forth.

The rear surface of the head 6 is preferably arcuately arranged with respect to the bore 8 and is provided with a plurality of teeth 10 extending therefrom. The teeth 10 are preferably squared, as shown in Fig. 1, and as shown in the drawings, are preferably two in number, although it will be understood that any desired suitable number of said teeth may be employed.

The movable member of my wrench is preferably L-shaped and comprises a shank 11 and a head 12, the inner side of said shank having a rack 13 formed thereon, the teeth of said rack being similar to the teeth 10, and the inner side of the head 12 is provided with a plurality of teeth 14 similar to the teeth 7. The shank 11 is held so that the rack thereon will engage the teeth 10 by means of a substantially U-shaped member 15, which extends therearound and the ends of said member extend upon either side of the head 6.

The ends of said member 15 are apertured, as shown at 16, at points in alinement with the bore 8 and a bolt 17 having an enlarged milled head 18 at one end is adapted to be extended through said aperture and through the bore 8.

The material of the ends of said member 15 is cut away laterally from the aperture 16, as indicated at 19 in Fig. 1. The end of the bolt 17 is provided with a laterally extending tongue 20, and when it is desired to assemble the parts of the wrench the movable member of the wrench is disposed in its closed position. In this position the member 15 will be moved so that the cut away portion 19 thereof will register with the way 9 in the head and the bolt may be extended therethrough, the tongue 20 on said bolt passing through the cut away portions 19 and the way 9.

In order to secure the parts in assembled position, the bolt 17 is given a half turn so that the tongue 20 will be positioned in a seat 21 formed in the face of one of the ends of the member 15, as indicated in Fig. 2. In order that the tongue may be held in said seat, I preferably interpose a spring washer 22 between the head 18 of the bolt and the other end of the member 15. The ends of the member 15 are extended beyond the forward edge of the shank 4 and have pivoted therebetween one end of a link 23, the opposite end of said link being pivotally secured at the bend of a substantially L-shaped lever 24. One end of said lever 24 is bifurcated and straddles the shank 4, the ends thereof being pivotally secured to an offset portion 25 formed at the rear side of the shank at a point adjacent the handle 5. The other end of said lever 24 is extended along said handle 5 in position to be gripped by the hand of the operator.

When the parts of my improved form of wrench are assembled in the positions indicated in Fig. 1 and it is desired to grip an object, it is only necessary to position the object between the stationary and movable jaws and to grip the lever 24. This results in swinging the member 15 upon the bolt 17 and the movable jaw will be moved toward the stationary jaw to tightly grip the object therebetween. Force may then be applied to the handle of the wrench to hold the object stationary while being worked upon or to turn said object.

When it is desired to use the wrench to engage an object which is larger than could be gripped by the wrench when the parts thereof are in the positions indicated in Fig. 1, it is only necessary to unseat the tongue 20 and give the bolt a half turn and remove said bolt from the bore, the member 15 may then be partially removed and the shank of the movable jaw moved until the teeth 10 engage different teeth on the rack 13. When the proper teeth have been engaged the member 15 is again properly positioned and the bolt 17 returned to place.

From the foregoing description it will be seen that I have provided a pipe wrench which can be quickly brought into operative position with respect to an object.

It will also be seen that the relative positions of the parts of the wrench may be quickly changed when it is desired to use the wrench upon objects of different sizes.

While I have shown the preferred form of my invention, I desire it to be understood that certain modifications may be made therein without departing from the spirit and scope of my invention.

What I claim as new is:

In a wrench, having a pivot-bearing therethrough, a jaw, a movable jaw operatively connected with the first said jaw by suitable actuating means, a U-shaped yoke having pivot-bearings therethrough and having the recesses communicating with the pivot-bearings and being formed with a depression in communication with one of said bearings and a pivot-pin formed with a radially extending tongue at one end and with a head at the other end, and a spring washer seated between the U-shaped yoke and the head of the pivot-pin for forcing the pivot-pin in the axial direction and securing said tongue in said depression, whereby the pivot-pin is prevented from accidentally rotating.

In testimony whereof I have signed my name to this specification in the presence of two subscribing witnesses.

JAMES D. WILSON.

Witnesses:
T. J. DOWELL,
FRANK GREEN.

---

Copies of this patent may be obtained for five cents each, by addressing the "Commissioner of Patents. Washington, D. C."